US011223983B2

(12) United States Patent
Ramachandra et al.

(10) Patent No.: US 11,223,983 B2
(45) Date of Patent: Jan. 11, 2022

(54) AUTOMATIC NEIGHBOUR RELATION (ANR) BASED ON DETECTION AND REPORTING OF UNKNOWN CELL BASED ON MEASUREMENT TRIGGERING CRITERION

(71) Applicant: TELEFONAKTIEBOLAGET LM ERICSSON (PUBL), Stockholm (SE)

(72) Inventors: Pradeepa Ramachandra, Linköping (SE); Icaro L. J. Da Silva, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/483,435

(22) PCT Filed: Jan. 3, 2018

(86) PCT No.: PCT/IB2018/050039
§ 371 (c)(1),
(2) Date: Aug. 5, 2019

(87) PCT Pub. No.: WO2018/142229
PCT Pub. Date: Aug. 9, 2018

(65) Prior Publication Data
US 2019/0357100 A1 Nov. 21, 2019

Related U.S. Application Data

(60) Provisional application No. 62/454,395, filed on Feb. 3, 2017.

(51) Int. Cl.
*H04W 36/00* (2009.01)
(52) U.S. Cl.
CPC . *H04W 36/00835* (2018.08); *H04W 36/0058* (2018.08); *H04W 36/0094* (2013.01)

(58) Field of Classification Search
CPC ......... H04W 36/0055; H04W 36/0058; H04W 36/0083; H04W 36/0085; H04W 36/0088;
(Continued)

(56) References Cited

U.S. PATENT DOCUMENTS

2012/0046066 A1  2/2012  Tamura et al.
2014/0092761 A1  4/2014  Behravan et al.
(Continued)

FOREIGN PATENT DOCUMENTS

CN   106233646 A   12/2016
EP      2744272 A1    6/2014
(Continued)

*Primary Examiner* — Peter Chen

(57) ABSTRACT

Systems and methods related to automatic neighbor relation in a wireless communication network are disclosed. In some embodiments, a method of operation of a User Equipment (UE) to assist a base station in a wireless communication network with automatic neighbor relation comprises receiving reference signal configurations for a plurality of cells and a measurement report triggering criterion. The reference signal configurations are configurations for reference signals to be used by the UE for Radio Resource Management (RRM) measurement reporting for the plurality of cells. The measurement report triggering criterion is related to detection, by the UE, of an unknown cell while performing measurements in accordance with the reference signal configurations for the plurality of cells, where an unknown cell is a cell other than the plurality of cells for which the UE has received the reference signal configurations. The method further comprises detecting an unknown cell and sending a report.

20 Claims, 5 Drawing Sheets

(58) Field of Classification Search
CPC ....... H04W 36/0094; H04W 36/00835; H04W 36/00837; H04W 36/30; H04W 56/001; H04W 24/02; H04W 24/04; H04W 24/08; H04W 24/10; H04W 72/046; H04W 72/0406; H04W 72/0413; H04W 72/042; H04W 72/08; H04W 72/082; H04W 72/085
See application file for complete search history.

(56) References Cited

U.S. PATENT DOCUMENTS

| | | | |
|---|---|---|---|
| 2015/0195731 A1* | 7/2015 | Jung | H04L 5/0048 370/252 |
| 2015/0195758 A1* | 7/2015 | Kim | H04W 36/0088 370/252 |
| 2016/0037425 A1* | 2/2016 | Van Lieshout | H04W 36/30 370/332 |
| 2016/0309332 A1 | 10/2016 | Norrman et al. | |
| 2016/0316403 A1* | 10/2016 | Li | H04W 24/10 |
| 2017/0238243 A1* | 8/2017 | Park | H04W 48/16 455/434 |
| 2018/0198585 A1* | 7/2018 | Lin | H04B 7/0617 |

FOREIGN PATENT DOCUMENTS

| | | |
|---|---|---|
| WO | 2009088332 A1 | 7/2009 |
| WO | 2011041753 A2 | 4/2011 |
| WO | 2014126345 A1 | 8/2014 |
| WO | 2016043363 A1 | 3/2016 |

\* cited by examiner

AUTOMATIC NEIGHBOUR RELATION (ANR) BASED ON DETECTION AND REPORTING OF UNKNOWN CELL BASED ON MEASUREMENT TRIGGERING CRITERION

RELATED APPLICATIONS

This application is a 371 of International Application No. PCT/IB2018/050039, filed Jan. 3, 2018, which claims the benefit of U.S. Application No. 62/454,395, filed Feb. 3, 2017, the disclosures of which are fully incorporated herein by reference.

TECHNICAL FIELD

The present disclosure relates to automatic neighbor relation in a wireless communication network.

BACKGROUND

Despite advanced radio network planning tools, it is very difficult to predict radio propagation in a wireless communication network in detail. As a consequence, it is difficult to predict which base stations need to have a relation to one another and maybe also a direct connection to one another prior to network deployment. This issue was addressed in Third Generation Partnership Project (3GPP) Long Term Evolution (LTE). In LTE, a User Equipment (UE) can receive a request for the UE to retrieve information that uniquely identifies an unknown base station from the system information broadcast by the unknown base station and then report this information to a serving base station of the UE. This information that uniquely identifies the unknown base station is used by the serving base station of the UE to convey messages to the unknown base station via the core network. The core network maintains a lookup table that maps the information that uniquely identifies the unknown base station to an established S1 connection. One such message conveyed from the serving base station to the unknown base station is a message used to request transport network layer address information necessary for a direct base station to base station connection between the two base stations via the X2 interface.

The same issue is expected to arise in 3GPP New Radio (NR), which is also sometimes referred to as NX. Therefore, in order for the mobility procedure in NR to operate smoothly, the NR base stations, which are also referred to as NR nodes or NR radio access nodes, need to have a concrete list of neighboring NR base stations that can be handover candidates for the UEs.

SUMMARY

Systems and methods related to automatic neighbor relation in a wireless communication network are disclosed. In some embodiments, a method of operation of a User Equipment (UE) to assist a base station in a wireless communication network with automatic neighbor relation comprises receiving reference signal configurations for a plurality of cells and a measurement report triggering criterion. The reference signal configurations are configurations for reference signals to be used by the UE for Radio Resource Management (RRM) measurement reporting for the plurality of cells. The measurement report triggering criterion is related to detection, by the UE, of an unknown cell while performing measurements in accordance with the reference signal configurations for the plurality of cells, where an unknown cell is a cell other than the plurality of cells for which the UE has received the reference signal configurations. The method further comprises detecting an unknown cell while performing measurements in accordance with the reference signal configurations and sending a report for the unknown cell to a base station serving a serving cell of the UE in accordance with the measurement report triggering criterion. In this manner, the UE can assist the base station with automatic neighbor relations.

In some embodiments, detecting the unknown cell comprises performing synchronization signal measurement in accordance with the reference signal configurations, where a synchronization signal from a detected cell is detected while performing the synchronization signal measurement. Detecting the unknown cell further comprises identifying the detected cell as the unknown cell upon determining that: (a) the detected cell is not one of the plurality of cells for which the UE has received the reference signal configurations and (b) a measurement for the synchronization signal from the detected cell is greater than a certain threshold.

In some embodiments, for each cell of the plurality of cells, the reference signal configuration for the cell comprises information that defines measurement gaps during which the UE can measure on a synchronization signal transmitted on the cell as a synchronization source for a respective one of the reference signals transmitted on the cell.

In some embodiments, the report for the unknown cell is a measurement report, and the method further comprises, after sending the measurement report for the unknown cell to the base station, receiving, from the base station, a request to read a globally unique identity of the unknown cell. The method further comprises obtaining the globally unique identity of the unknown cell from system information broadcast by the unknown cell and reporting the globally unique identity of the unknown cell to the base station.

In some embodiments, the method further comprises obtaining a globally unique identity of the unknown cell from system information broadcast by the unknown cell, wherein the report for the unknown cell comprises the globally unique identity of the unknown cell to the base station.

In some embodiments, the UE is in connected mode.

In some embodiments, the reference signals are layer 3 reference signals for mobility purposes.

In some embodiments, the reference signals are Channel State Information Reference Signals (CSI-RSs).

In some embodiments, the reference signals are beamformed.

Embodiments of a UE for assisting a base station in a wireless communication network with automatic neighbor relation are also disclosed. In some embodiments, a UE for assisting a base station in a wireless communication network with automatic neighbor relation is adapted to receive reference signal configurations for a plurality of cells and a measurement report triggering criterion, wherein the reference signal configurations are configurations for reference signals to be used by the UE for RRM measurement reporting for the plurality of cells and the measurement report triggering criterion is related to detection, by the UE, of an unknown cell while performing measurements in accordance with the reference signal configurations for the plurality of cells, where an unknown cell is a cell other than the plurality of cells for which the UE has received the reference signal configurations. The UE is further adapted to detect an unknown cell while performing measurements in accordance with the reference signal configurations and send a report for the unknown cell to a base station serving a serving cell of the UE in accordance with the measurement report triggering criterion.

In some embodiments, a UE for assisting a base station in a wireless communication network with automatic neighbor relation comprises an interface operable to transmit signals to and receive signals from a base station and a processor operable to cause the UE to receive, via the interface, reference signal configurations for a plurality of cells and a measurement report triggering criterion, wherein the reference signal configurations are configurations for reference signals to be used by the UE for RRM measurement reporting for the plurality of cells and the measurement report triggering criterion is related to detection, by the UE, of an unknown cell while performing measurements in accordance with the reference signal configurations for the plurality of cells, where an unknown cell is a cell other than the plurality of cells for which the UE has received the reference signal configurations. The processor is further operable to cause the UE to detect an unknown cell while performing measurements in accordance with the reference signal configurations and send, via the interface, a report for the unknown cell to a base station serving a serving cell of the UE in accordance with the measurement report triggering criterion.

In some embodiments, a UE for assisting a base station in a wireless communication network with automatic neighbor relation comprises a receiving module, a detecting module, and a sending module. The receiving module is operable to receive reference signal configurations for a plurality of cells and a measurement report triggering criterion, wherein the reference signal configurations are configurations for reference signals to be used by the UE for RRM measurement reporting for the plurality of cells and the measurement report triggering criterion is related to detection, by the UE, of an unknown cell while performing measurements in accordance with the reference signal configurations for the plurality of cells, where an unknown cell is a cell other than the plurality of cells for which the UE has received the reference signal configurations. The detecting module is operable to detect an unknown cell while performing measurements in accordance with the reference signal configurations. The sending module is operable to send a report for the unknown cell to a base station serving a serving cell of the UE in accordance with the measurement report triggering criterion.

Embodiments of a method of operation of a base station in a wireless communication network to interact with a UE to provide automatic neighbor relation are also disclosed. In some embodiments, a method of operation of a base station in a wireless communication network to interact with a UE to provide automatic neighbor relation comprises providing, to a UE, reference signal configurations for a plurality of cells and a measurement report triggering criterion, wherein the reference signal configurations are configurations for reference signals to be used by the UE for RRM measurement reporting for the plurality of cells and the measurement report triggering criterion is related to detection, by the UE, of an unknown cell while performing measurements in accordance with the reference signal configurations for the plurality of cells, where an unknown cell is a cell other than the plurality of cells for which the UE has received the reference signal configurations. The method further comprises receiving, from the UE in accordance with the triggering criterion, a report for an unknown cell detected by the UE while performing measurements in accordance with the reference signal configurations.

In some embodiments, for each cell of the plurality of cells, the reference signal configuration for the cell comprises information that defines measurement gaps during which the UE can measure on a synchronization signal transmitted on the cell as a synchronization source for a respective one of the reference signals transmitted on the cell.

In some embodiments, the report for the unknown cell is a measurement report, and the method further comprises upon receiving the measurement report for the unknown cell from the UE, providing, to the UE, a request to read a globally unique identity of the unknown cell. The method further comprises receiving the globally unique identity of the unknown cell from the UE.

In some embodiments, the report for the unknown cell received from the UE comprises a globally unique identity of the unknown cell.

In some embodiments, the UE is in connected mode.

In some embodiments, the reference signals are layer 3 reference signals for mobility purposes.

In some embodiments, the reference signals are CSI-RSs.

In some embodiments, the reference signals are beamformed.

Embodiments of a base station in a wireless communication network for interacting with a UE to provide automatic neighbor relation are also disclosed. In some embodiments, a base station in a wireless communication network for interacting with a UE to provide automatic neighbor relation is adapted to provide, to a UE, reference signal configurations for a plurality of cells and a measurement report triggering criterion, wherein the reference signal configurations are configurations for reference signals to be used by the UE for RRM measurement reporting for the plurality of cells and the measurement report triggering criterion is related to detection, by the UE, of an unknown cell while performing measurements in accordance with the reference signal configurations for the plurality of cells, where an unknown cell is a cell other than the plurality of cells for which the UE has received the reference signal configurations. The base station is further adapted to receive, from the UE in accordance with the triggering criterion, a report for an unknown cell detected by the UE while performing measurements in accordance with the reference signal configurations.

In some embodiments, a base station in a wireless communication network for interacting with a UE to provide automatic neighbor relation comprises an interface operable to transmit signals to and receive signals from a UE and a processor operable to cause the base station to provide, to the UE via the interface, reference signal configurations for a plurality of cells and a measurement report triggering criterion, wherein the reference signal configurations are configurations for reference signals to be used by the UE for RRM measurement reporting for the plurality of cells and the measurement report triggering criterion is related to detection, by the UE, of an unknown cell while performing measurements in accordance with the reference signal configurations for the plurality of cells, where an unknown cell is a cell other than the plurality of cells for which the UE has received the reference signal configurations. The processor is further operable to cause the base station to receive, from the UE via the interface in accordance with the triggering criterion, a report for an unknown cell detected by the UE while performing measurements in accordance with the reference signal configurations.

In some embodiments, a base station in a wireless communication network for interacting with a UE to provide automatic neighbor relation comprises a providing module and a receiving module. The providing module is operable to provide, to a UE, reference signal configurations for a plurality of cells and a measurement report triggering criterion, wherein the reference signal configurations are configurations for reference signals to be used by the UE for RRM measurement reporting for the plurality of cells and the measurement report triggering criterion is related to detection, by the UE, of an unknown cell while performing measurements in accordance with the reference signal configurations for the plurality of cells, where an unknown cell is a cell other than the plurality of cells for which the UE has received the reference signal configurations. The receiving module is operable to receive, from the UE in accordance with the triggering criterion, a report for an unknown cell detected by the UE while performing measurements in accordance with the reference signal configurations.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
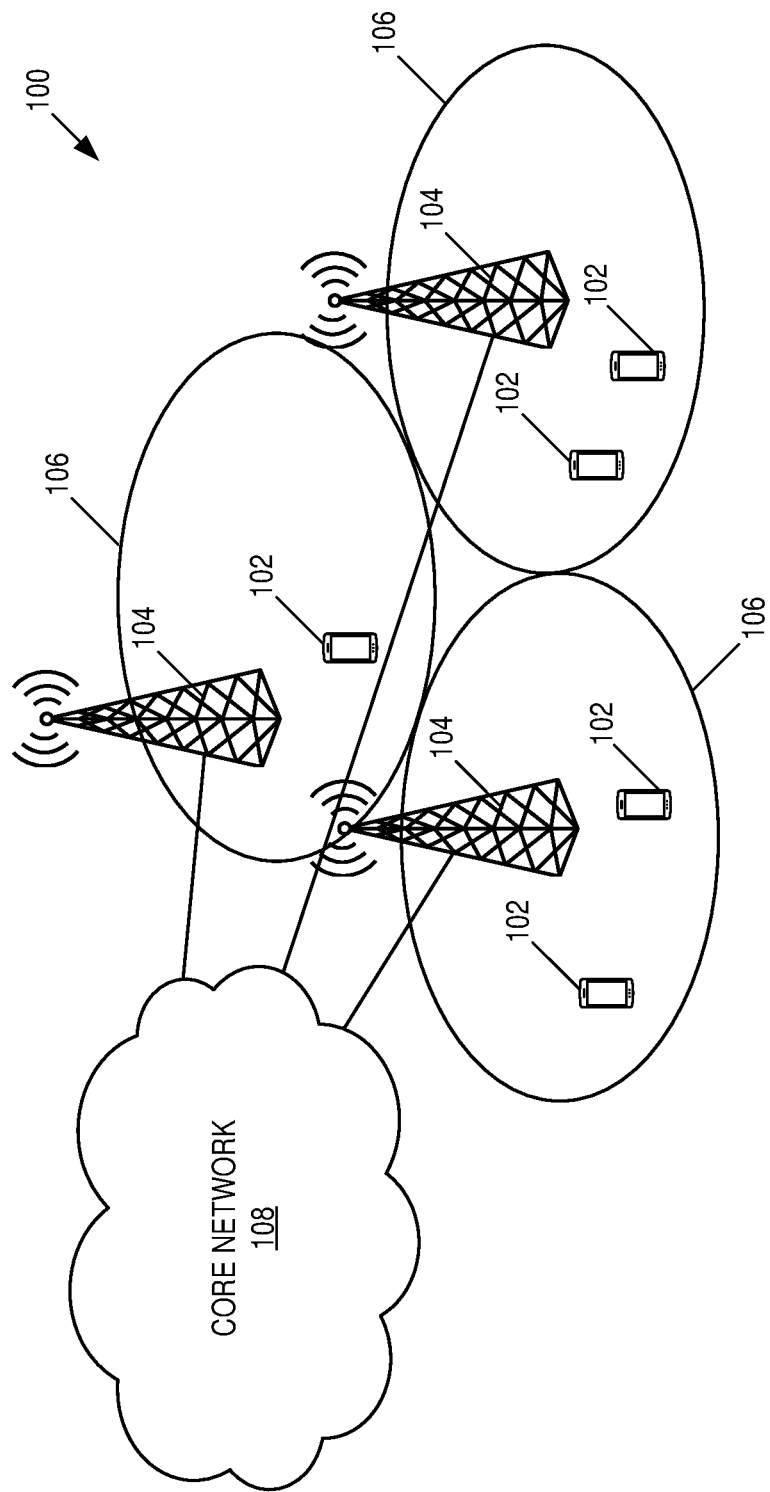
FIG. 1 illustrates one example of a wireless communication network in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Before describing embodiments of the present disclosure, a brief discussion of some aspects of Third Generation Partnership Project (3GPP) New Radio (NR) is beneficial.

With respect to active mode mobility in NR, the following agreements have been made in 3GPP:

The following always-on signals are used for Radio Resource Management (RRM) measurement for Layer 3 (L3) mobility in IDLE mode:
NR synchronization signal; or
NR synchronization signal, and additional Demodulation Reference Signals (DM-RSs) for Physical Broadcast Channel (PBCH) if DM-RS is supported for PBCH, or
Note: How to use DM-RS for RRM measurement is up to User Equipment (UE) implementation
DM-RS for PBCH if DM-RS is supported for PBCH
Note that down selection will be needed if DM-RS for PBCH is supported
For CONNECTED mode RRM measurement for L3 mobility, the following Reference Signals (RSs) can be used if needed, in addition to IDLE mode RSs:
For Future Study (FFS): Channel State Information Reference Signal (CSI-RS)
FFS: RS separately designed from CSI-RS
Note that the possibility of multiplexing of wideband RS in Synchronization Signals (SS) block is not precluded Thus, as stated above, it was agreed (in the RAN1#AH1-NR meeting) that the CONNECTED mode (i.e., the RRC_CONNECTED MODE) UEs can use additional signals for RRM measurements along with signals to be for IDLE mode (i.e., RRC_IDLE mode) RRM measurements.

Though the exact signal to be used for such a purpose is left as a FFS item, it can be assumed that the RRC_CONNECTED mode UE could count on only these signals and the base station (i.e., the Fifth Generation (5G) enhanced or evolved Node B (eNB), which is also referred to as a NR base station (gNB)) can get all the required information about the serving cell and the neighboring nodes' quality in the measurement report sent by the UE in RRC_CONNECTED mode. The exact identifiers that the UE will include in the measurement report are yet to be agreed upon. For instance, the UE can include cell level RSRP and/or RSRQ and/or SINR plus beam level RSRP and/or RSRQ and/or SINR.

It must be noted that the two signals, the NR synchronization signal and an additional RS (e.g., CSI-RS) can use different beamformers. When the beamforming gain associated to the additional RS is very much larger than the beamforming gain associated to the NR synchronization signal, the UE might fail to detect the low powered NR synchronization signal as a result of a dynamic range issue in the receiver chain of the UE.

When the additional RS used for the RRC_CONNECTED mode is CSI-RS, the CSI-RS needs to have a configuration wherein the synchronization source associated to the CSI-RS is provided by the serving node. This indicates that the UE will not be able to measure on any CSI-RS for which the UE is not configured, although the UE might have the ability to receive such a signal if the network had configured the UE accordingly. This can be seen as a limiting factor in identifying an unknown neighbor. The same problem will be present in any additional RS where the additional RS' RRM measurements are dependent on the associated NR synchronization signal.

It is proposed herein that the above mentioned problem may be solved by configuring the UE with a new measurement report triggering criterion. This measurement report triggering criterion relates to the event wherein the UE detects (above a certain absolute or relative threshold) a cell which is not in the configured list of cells (i.e., the list of cells for which the UE has received a configuration of the additional RS, where the additional RS is a RS, other than a synchronization signal, to be used by the UE for L3 mobility purposes). Cell related measurements are carried out by the UE during the measurement gaps provided by the serving node to measure on the NR synchronization signals if the UE requires measurement gaps to measure on NR synchronization signals. With the proposed solution, the UE will be able to help the serving node to identify any unknown neighboring nodes, which enables the serving node to establish neighbor relations with such an unknown node. This will help the serving node to configure UEs with proper CSI-RS related configurations from the newly established neighbors.

By providing the UE with an additional measurement report triggering criterion, the serving node uses the UE to identify any unknown neighboring NR cell in the vicinity.

It is to be noted that any feature of any of the embodiments disclosed herein may be applied to any other embodiment, wherever appropriate. Likewise, any advantage of any of the embodiments may apply to the other embodiments, and vice versa. Other objectives, features, and advantages of the enclosed embodiments will be apparent from the following description.

Some of the embodiments contemplated herein will now be described more fully hereinafter with reference to the accompanying drawings. Other embodiments, however, are contained within the scope of this disclosure and the present disclosure should not be construed as limited to only the embodiments set forth herein; rather, these embodiments are provided by way of example to convey the scope of the inventive concept to those skilled in the art. Like numbers refer to like elements throughout the description.

FIG. 1 illustrates one example of a wireless communication network 100 in which embodiments of the present disclosure may be implemented. In the preferred embodiments described herein, the wireless communication network 100 is a 3GPP 5G NR network, but is not limited thereto. As illustrated, a number of UEs 102 wirelessly transmit signals to and receive signals from Radio Base Stations (RBSs) 104 (e.g., gNBs, which are 5G NR base stations), each serving one or more cells 106. The RBSs 104 are connected to a core network 108 that includes one or more core network nodes, as will be appreciated by one of ordinary skill in the art.

Figure 2:
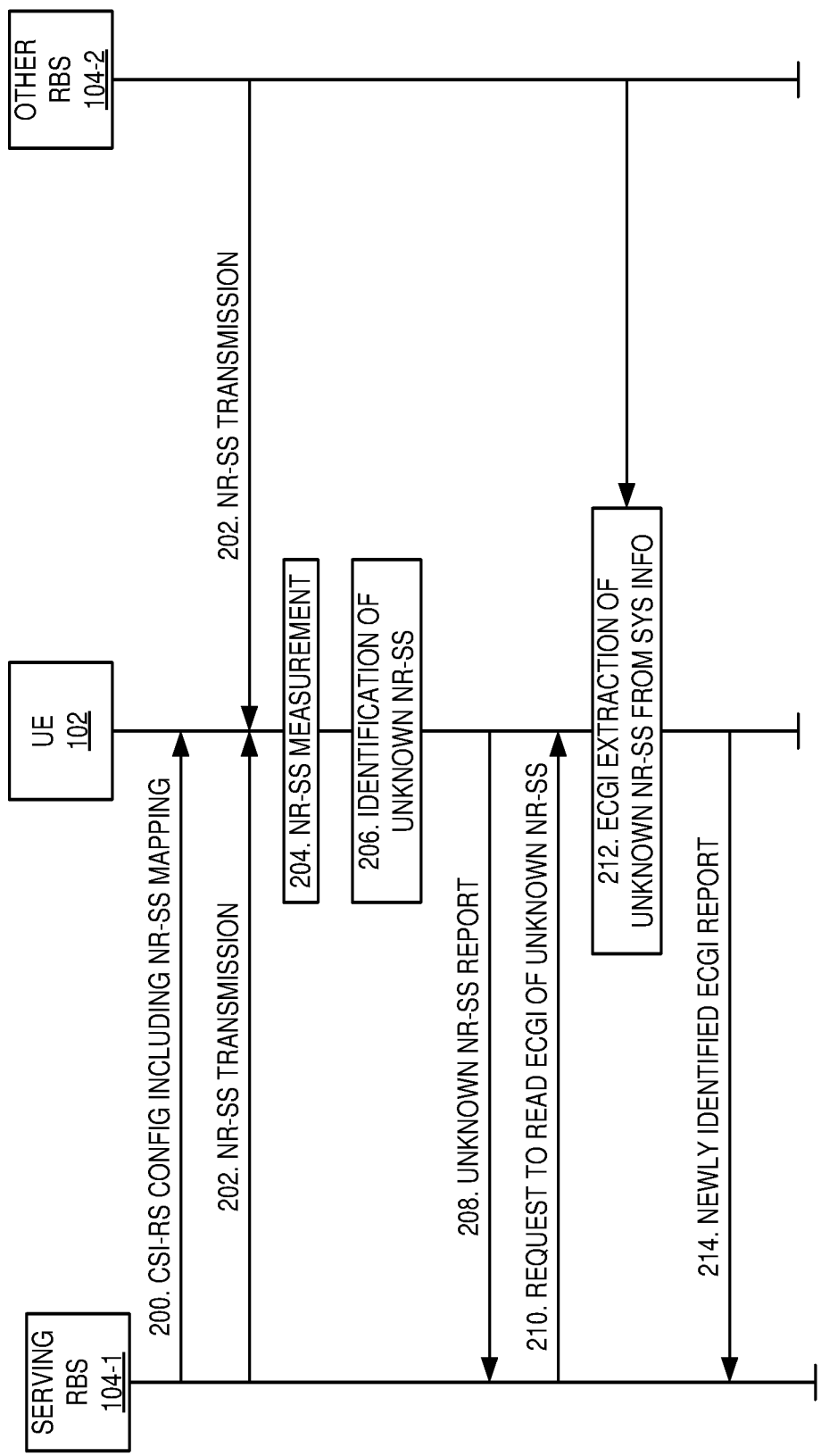
FIG. 2 is a signal flow graph that illustrates the operation of a wireless communication network in accordance with a first embodiment of the present disclosure.

FIG. 2 is a signal flow graph that illustrates one embodiment of the solution proposed herein. Different steps in the signal flow graph are explained below.

Step 200: CSI-RS configuration for RRM measurements: In this step, the network, and specifically the serving RBS 104-1 of the UE 102, configures the UE 102 with CSI-RS configurations that the UE 102 should use for RRM measurement reporting. This configuration includes measurement gaps during which the UE 102 can measure on the NR-SS (NR Primary Synchronization Signal (NR-PSS), NR Secondary Synchronization Signal (NR-SSS)) as a synchronization source for measuring CSI-RS. The configuration can also involve additional event triggers related to when the UE 102 can generate a measurement report. This additional event trigger is related to when the UE 102 discovers a new NR-SS (NR-PSS, NR-SSS) (i.e., a new cell) other than the already configured list of NR-SSs (i.e., other than the cells for which the UE 102 has received a CSI-RS configuration) while measuring in the configured measurement gap. Thus, the configuration in step 200 also includes a configuration of a measurement event trigger, which is also referred to herein as a measurement report triggering criterion, that is related to detection, by the UE 102, of an unknown cell while performing measurements in the measurement gaps in accordance with the CSI-RS configurations. An "unknown" cell is a cell other than the cells for which the UE 102 has received a CSI-RS configuration in step 200.

Step 202: NR-SS transmission: The network nodes transmit the NR-SS. Specifically, as illustrated, the serving RBS 104-1 transmits NR-SS and another RBS 104-2 also transmits NR-SS. As discussed below, the other RBS 104-2 transmits a NR-SS on a cell that is unknown to the UE 102 (i.e., is a cell for which the UE 102 has not received a CSI-RS configuration).

Step 204: NR-SS measurement: The UE 102 performs the NR-SS measurement. As discussed above, the UE 102 performs the NR-SS measurement during a measurement gap(s) configured in the CSI-RS configurations received in step 200.

Step 206: Identification of unknown NR-SS: The UE 102 identifies the presence of an unknown cell based on the measured NR-SSs. The identification can be performed if such a measured NR-SS is above a certain absolute/relative threshold.

Thus, by performing steps 204 and 206, the UE 102 detects the NR-SS transmitted by the other RBS 104-2 while performing measurements in accordance with the CSI-RS configurations received in step 200. Since the NR-SS transmitted by the other RBS 104-2 corresponds to a cell that is not one of the cells for which the UE 102 has received a CSI-RS configuration and, in some embodiments, since the measurement for this NR-SS is above a certain threshold, the NR-SS is identified as an unknown NR-SS (i.e., the corresponding cell is identified as an unknown cell).

Step 208: Unknown NR-SS report: The UE 102 reports the unknown NR-SS to the serving cell. As discussed above, the UE 102 is configured with a measurement report triggering criterion related to the detection of unknown cells. Thus, in step 208, the UE 102 reports the unknown cell detected in steps 204 and 206 to the serving cell (i.e., to the serving RBS 104-1) in accordance with the measurement report triggering criterion.

Step 210: Request to read Enhanced Cell Global Identifier (ECGI) of the unknown NR-SS: The serving cell (i.e., the serving RBS 104-1) requests the UE 102 to read the system information of the reported (in step 208) unknown cell. Note that in LTE this cell global identifier is the Evolved Universal Terrestrial Radio Access Network Cell Global Identifier (ECGI). However, in NR, this analogous CGI is referred to herein as the Enhanced Cell Global Identifier (ECGI).

Step 212: ECGI extraction of unknown NR-SS (i.e., unknown cell) from the system information broadcast on the unknown cell: The UE 102 performs system information decoding and finds the ECGI of the node that transmitted the unknown NR-SS. As illustrated, the node that transmitted the unknown NR-SS in the illustrated example is the other RBS 104-2.

Step 214: Newly identified ECGI report: The UE 102 reports the newly extracted ECGI to the serving cell (i.e., to the serving RBS 104-1). The serving cell (i.e., the serving RBS 104-1) can use this ECGI value to establish neighbor relations with the corresponding node (i.e., the other RBS 104-2).

Figure 3:
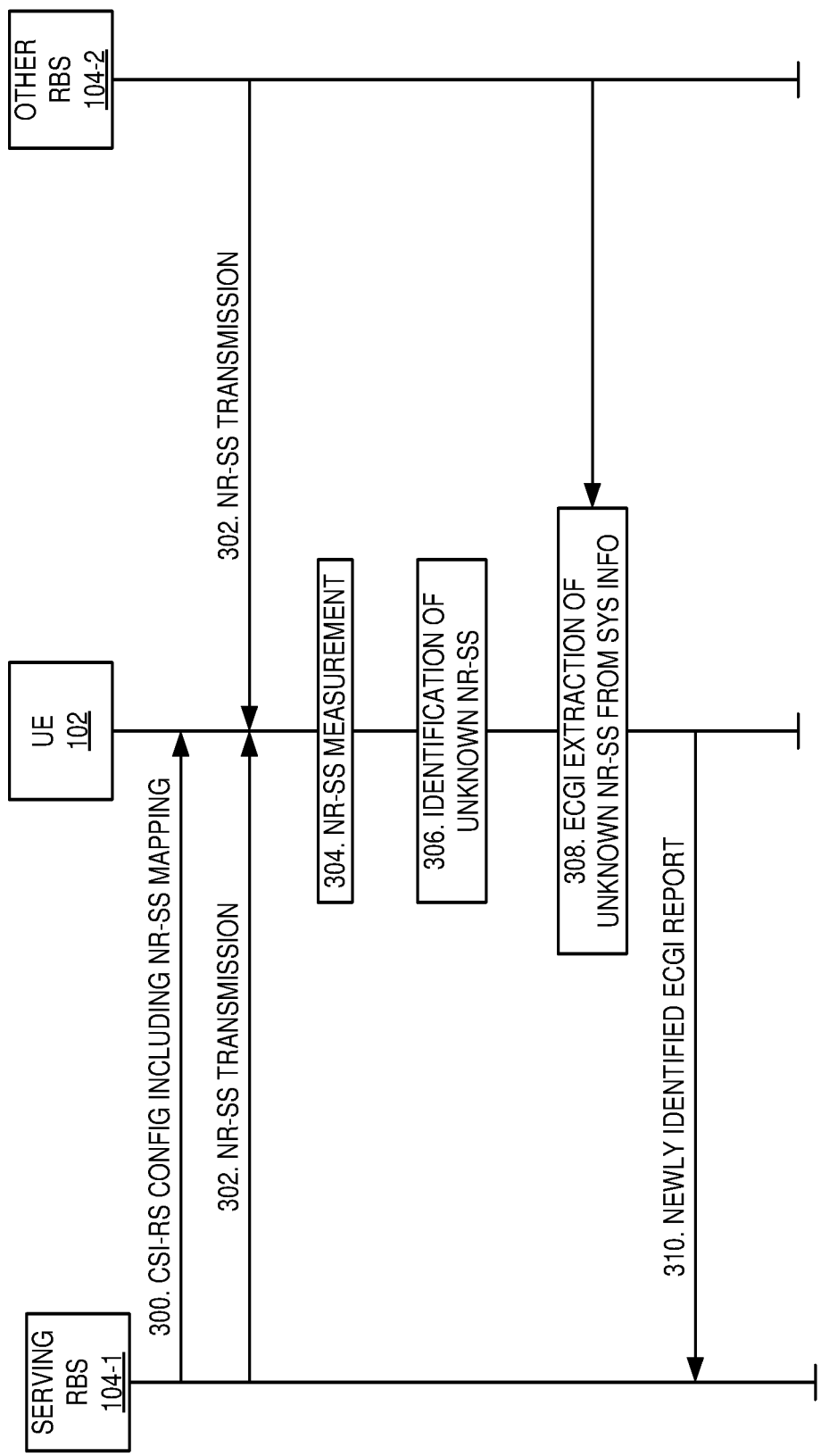
FIG. 3 is a signal flow graph that illustrates the operation of a wireless communication network in accordance with a second embodiment of the present disclosure.

In another embodiment, the UE 102 reads the system information of the unknown cell without waiting for a request from the serving cell and reports the found ECGI and the NR-SS values (e.g., the cell level measurements such as, e.g., other RBS's cell level RSRP/RSRQ/SINR values) or the beam level measurements of other RBS (e.g., which particular beam of the other RBS was strongest and what was its RSRP/RSRQ/SINR values) to the serving cell. This is shown in FIG. 3. Steps 300-310 of FIG. 3 correspond to steps 200-206 and 214 of FIG. 2, respectively. As such, the details are not repeated.

It should be noted that the process described herein may also provide an additional advantage in that the UE 102 can be configured with very few CSI-RSs to begin with and then later on the UE 102 reports if the UE 102 finds a different cell (based on NR-SS measurements) as a suitable cell for which the CSI-RS could be good to measure. When the UE 102 triggers the measurement report as described above with respect to step 208, the serving RBS 104-1 recognizes that the reported NR-SS is already a known neighbor, and then the serving RBS 104-1 configures the UE 102 with the CSI-RSs related to the other-RBS (e.g., RBS 104-2) serving the newly discovered suitable cell of the UE 102. This will reduce the amount of CSI-RSs monitored by the UE 102 at a given time. Otherwise, the UE 102 has to be configured with many CSI-RSs belonging to all the known neighbor nodes.

Figure 4:
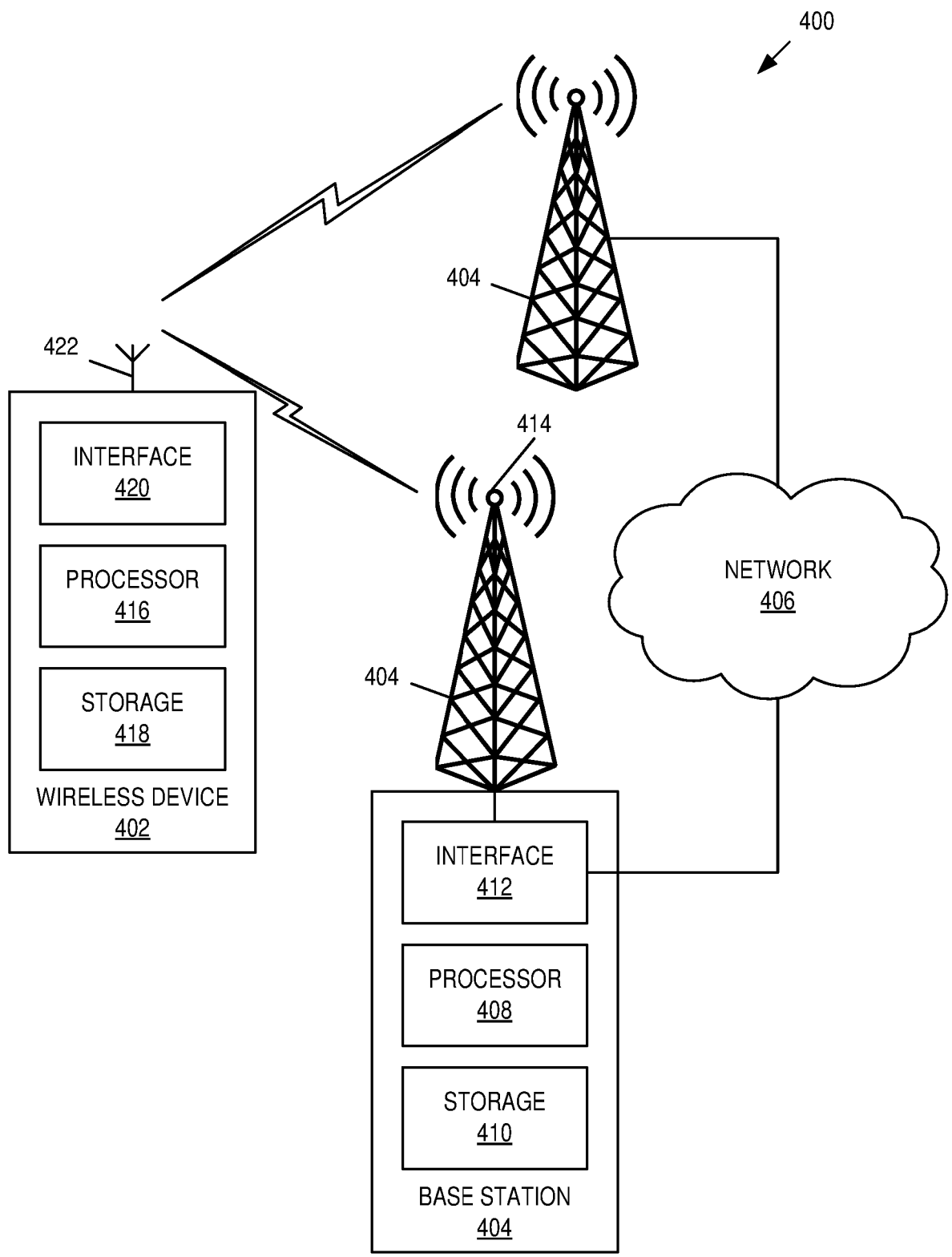
FIG. 4 illustrates another example of a wireless communication network including a more detailed illustration of a wireless device and a network node.

Although the solutions described above may be implemented in any appropriate type of device and/or system using any suitable components, particular embodiments of the described solutions may be implemented in a wireless network such as the example wireless communication network 400 illustrated in FIG. 4. Note that the wireless communication network 400 corresponds to the wireless communication network 100 of FIG. 1. In the example embodiment of FIG. 4, the wireless communication network 400 provides communication and other types of services to one or more wireless devices 402, which correspond to the UEs 102 of FIG. 1. In the illustrated embodiment, the wireless communication network 400 includes one or more instances of network nodes that facilitate the wireless devices' access to and/or use of the services provided by the wireless communication network 400. In the illustrated example, the network nodes are base stations 404, which correspond to the base stations 104 of FIG. 1. The wireless communication network 400 may further include any additional elements suitable to support communication between wireless devices 402 or between a wireless device 402 and another communication device, such as a landline telephone.

A network 406, which corresponds to the core network 108 of FIG. 1, may comprise one or more Internet Protocol (IP) networks, Public Switched Telephone Networks (PSTNs), packet data networks, optical networks, Wide Area Networks (WANs), Local Area Networks (LANs), Wireless Local Area Networks (WLANs), wired networks, wireless networks, metropolitan area networks, and other networks to enable communication between devices.

The wireless communication network 400 may represent any type of communication, telecommunication, data, cellular, and/or radio network or other type of system. In particular embodiments, the wireless communication network 400 may be configured to operate according to specific standards or other types of predefined rules or procedures. Thus, particular embodiments of the wireless communication network 400 may implement communication standards, such as Global System for Mobile Communications (GSM), Universal Mobile Telecommunications System (UMTS), Long Term Evolution (LTE), and/or other suitable Second, Third, Fourth, or Fifth Generation (2G, 3G, 4G, or 5G) standards; WLAN standards, such as the IEEE 802.11 standards; and/or any other appropriate wireless communication standard, such as the Worldwide Interoperability for Microwave Access (WiMax), Bluetooth, and/or ZigBee standards. Note, however, that in the preferred embodiments described herein, the wireless communication network 400 implements a 3GPP NR standard.

FIG. 4 includes a more detailed view of the base station 404 (also referred to herein as network node 404) and the wireless device 402, in accordance with a particular embodiment. These details are equally applicable to the base station 104 and the wireless device 102 of FIG. 1. For simplicity, FIG. 4 only depicts the network 406, the network nodes 404, and the wireless device 402. The network node 404 comprises a processor 408, storage 410, an interface 412, and an antenna 414. Similarly, the wireless device 402 comprises a processor 416, storage 418, an interface 420, and an antenna 422. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged, and/or operable to communicate directly or indirectly with a wireless device and/or with other equipment in the wireless communication network that enable and/or provide wireless access to the wireless device. Examples of network nodes include, but are not limited to, Access Points (APs), in particular radio access points. A network node may represent base stations, such as RBSs. Particular examples of RBSs include Node Bs, eNBs, and gNBs. Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed RBS such as centralized digital units and/or Remote Radio Units (RRUs), sometimes referred to as Remote Radio Heads (RRHs). Such RRUs may or may not be integrated with an antenna as an antenna integrated radio. Parts of a distributed RBS may also be referred to as nodes in a Distributed Antenna System (DAS).

As a particular non-limiting example, a base station may be a relay node or a relay donor node controlling a relay.

Yet further examples of network nodes include Multi-Standard Radio (MSR) radio equipment such as MSR base stations, network controllers such as Radio Network Controllers (RNCs) or Base Station Controllers (BSCs), Base Transceiver Stations (BTSs), transmission points, transmission nodes, Multi-cell/multicast Coordination Entities (MCEs), core network nodes (e.g., Mobile Switching Center (MSCs), Mobility Management Entity (MMEs)), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above.

In FIG. 4, the network node 404 comprises the processor 408, the storage 410, the interface 412, and the antenna 414. These components are depicted as single boxes located within a single larger box. In practice however, a network node 404 may comprise multiple different physical components that make up a single illustrated component (e.g., the interface 412 may comprise terminals for coupling wires for a wired connection and a radio transceiver for a wireless connection). As another example, the network node 404 may be a virtual network node in which multiple different physically separate components interact to provide the functionality of the network node 404 (e.g., the processor 408 may comprise three separate processors located in three separate enclosures, where each processor is responsible for a different function for a particular instance of the network node 404). Similarly, the network node 404 may be composed of multiple physically separate components (e.g., a Node B component and a RNC component, a BTS component and a BSC component, etc.), which may each have their own respective processor, storage, and interface components. In certain scenarios in which the network node 404 comprises multiple separate components (e.g., BTS and BSC components), one or more of the separate components may be shared among several network nodes. For example, a single RNC may control multiple Node Bs. In such a scenario, each unique Node B and BSC pair may be a separate network node. In some embodiments, the network node 404 may be configured to support multiple Radio Access Technologies (RATs). In such embodiments, some components may be duplicated (e.g., separate storage 410 for the different RATs) and some components may be reused (e.g., the same antenna 414 may be shared by the RATs).

The processor 408 may be a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software and/or encoded logic operable to provide, either alone or in conjunction with other network node 404 components, such as the storage 410, network node 404 functionality. For example, the processor 408 may execute instructions stored in the storage 410. Such functionality may include providing various wireless features discussed herein to a wireless device, such as the wireless device 402, including any of the features or benefits disclosed herein.

The storage 410 may comprise any form of volatile or non-volatile computer readable memory including, without limitation, persistent storage, solid state memory, remotely mounted memory, magnetic media, optical media, Random Access Memory (RAM), Read Only Memory (ROM), removable media, or any other suitable local or remote memory component. The storage 410 may store any suitable instructions, data, or information, including software and encoded logic, utilized by the network node 404. The storage 410 may be used to store any calculations made by the processor 408 and/or any data received via the interface 412.

The network node 404 also comprises the interface 412 which may be used in the wired or wireless communication of signaling and/or data between the network node 404, the network 406, and/or the wireless device 402. For example, the interface 412 may perform any formatting, coding, or translating that may be needed to allow the network node 404 to send and receive data from the network 406 over a wired connection. The interface 412 may also include a radio transmitter and/or receiver that may be coupled to or a part of the antenna 414. The radio may receive digital data that is to be sent out to other network nodes or wireless devices via a wireless connection. The radio may convert the digital data into a radio signal having the appropriate channel and bandwidth parameters. The radio signal may then be transmitted via the antenna 414 to the appropriate recipient (e.g., the wireless device 402).

The antenna 414 may be any type of antenna capable of transmitting and receiving data and/or signals wirelessly. In some embodiments, the antenna 414 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" refers to a device capable, configured, arranged, and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, UEs such as smart phones. Further examples include wireless cameras, wireless-enabled tablet computers, Laptop Embedded Equipment (LEE), Laptop Mounted Equipment (LME), Universal Serial Bus (USB) dongles, and/or wireless Customer Premise Equipment (CPE).

As one specific example, a wireless device may represent a UE configured for communication in accordance with one or more communication standards promulgated by the 3GPP, such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support Device-To-Device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a Machine-To-Machine (M2M) device, which may in a 3GPP context be referred to as a Machine Type Communication (MTC) device. As one particular example, the wireless device may be a UE implementing the 3GPP Narrowband IoT (NB-IoT) standard. Particular examples of such machines or devices are sensors, metering devices such as power meters, industrial machinery, or home or personal appliances, e.g. refrigerators, televisions, personal wearables such as watches, etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 4, the wireless device 402 may be any type of wireless endpoint, mobile station, mobile phone, wireless local loop phone, smartphone, UE, desktop computer, Personal Digital Assistant (PDA), cell phone, tablet, laptop, Voice over IP (VoIP) phone or handset, which is able to wirelessly send and receive data and/or signals to and from a network node, such as the network node 404, and/or other wireless devices. The wireless device 402 comprises the processor 416, the storage 418, the interface 420, and the antenna 422. Like the network node 404, the components of the wireless device 402 are depicted as single boxes located within a single larger box, however in practice a wireless device may comprises multiple different physical components that make up a single illustrated component (e.g., the storage 418 may comprise multiple discrete microchips, each microchip representing a portion of the total storage capacity).

The processor 416 may be a combination of one or more of a microprocessor, controller, microcontroller, CPU, DSP, ASIC, FPGA, or any other suitable computing device, resource, or combination of hardware, software and/or encoded logic operable to provide, either alone or in combination with other wireless device 402 components, such as the storage 418, wireless device 402 functionality. Such functionality may include providing various wireless features discussed herein, including any of the features or benefits disclosed herein.

The storage 418 may be any form of volatile or non-volatile memory including, without limitation, persistent storage, solid state memory, remotely mounted memory, magnetic media, optical media, RAM, ROM, removable media, or any other suitable local or remote memory component. The storage 418 may store any suitable data, instructions, or information, including software and encoded logic, utilized by the wireless device 402. The storage 418 may be used to store any calculations made by the processor 416 and/or any data received via the interface 420.

The interface 420 may be used in the wireless communication of signaling and/or data between the wireless device 402 and the network node 404. For example, the interface 420 may perform any formatting, coding, or translating that may be needed to allow the wireless device 402 to send and receive data from the network node 404 over a wireless connection. The interface 420 may also include a radio transmitter and/or receiver that may be coupled to or a part of the antenna 422. The radio may receive digital data that is to be sent out to the network node 404 via a wireless connection. The radio may convert the digital data into a radio signal having the appropriate channel and bandwidth parameters. The radio signal may then be transmitted via the antenna 422 to the network node 404.

The antenna 422 may be any type of antenna capable of transmitting and receiving data and/or signals wirelessly. In some embodiments, the antenna 422 may comprise one or more omni-directional antennas operable to transmit/receive radio signals between 2 GHz and 66 GHz. For simplicity, the antenna 422 may be considered a part of the interface 420 to the extent that a wireless signal is being used.

Figure 5:
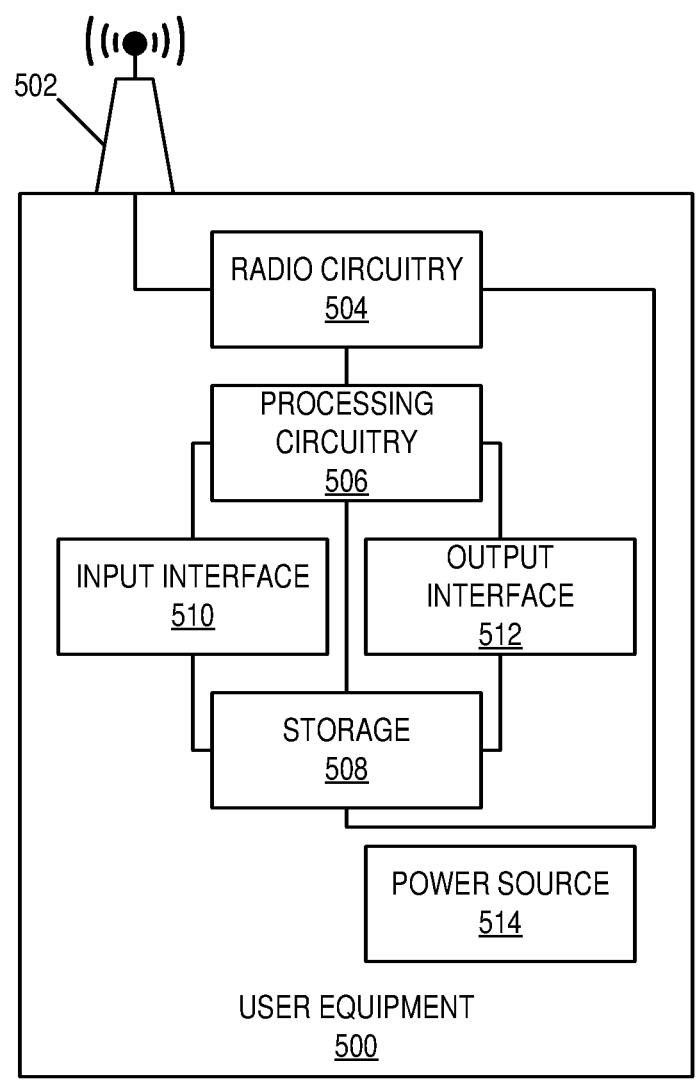
FIG. 5 illustrates one example of a wireless device.

As shown in FIG. 5, a UE 500 is an example wireless device. The UE 500 includes an antenna 502, radio front-end circuitry 504, processing circuitry 506, and a computer-readable storage medium 508. The antenna 502 may include one or more antennas or antenna arrays, and is configured to send and/or receive wireless signals, and is connected to the radio front-end circuitry 504. In certain alternative embodiments, the UE 500 may not include the antenna 502, and the antenna 502 may instead be separate from the UE 500 and be connectable to the UE 500 through an interface or port.

The radio front-end circuitry 504 may comprise various filters and amplifiers, is connected to the antenna 502 and the processing circuitry 506, and is configured to condition signals communicated between the antenna 502 and the processing circuitry 506. In certain alternative embodiments, the UE 500 may not include the radio front-end circuitry 504, and the processing circuitry 506 may instead be connected to the antenna 502 without the radio front-end circuitry 504.

The processing circuitry 506 may include one or more of Radio Frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. The processing circuitry 506 may include, for example, one or more CPUs, one or more microprocessors, one or more ASICs, and/or one or more FPGAs.

In particular embodiments, some or all of the functionality described herein as being provided by a wireless device may be provided by the processing circuitry 506 executing instructions stored on the computer-readable storage medium 508. In alternative embodiments, some or all of the functionality may be provided by the processing circuitry 506 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 506 alone or to other components of the UE 500, but are enjoyed by the wireless device as a whole, and/or by end users and the wireless network generally.

The antenna 502, the radio front-end circuitry 504, and/or the processing circuitry 506 may be configured to perform any receiving operations described herein as being performed by a wireless device. Any information, data, and/or signals may be received from a network node and/or another wireless device.

The processing circuitry 506 may be configured to perform any determining operations described herein as being performed by a wireless device. Determining as performed by processing circuitry 506 may include processing information obtained by the processing circuitry 506 by, for example, converting the obtained information into other information, comparing the obtained information or converted information to information stored in the wireless device, and/or performing one or more operations based on the obtained information or converted information, and as a result of said processing making a determination.

The antenna 502, the radio front-end circuitry 504, and/or the processing circuitry 506 may be configured to perform any transmitting operations described herein as being performed by a wireless device. Any information, data, and/or signals may be transmitted to a network node and/or another wireless device.

The computer-readable storage medium 508 is generally operable to store instructions, such as a computer program, software, an application including one or more of logic, rules, code, tables, etc., and/or other instructions capable of being executed by a processor. Examples of the computer-readable storage medium 508 include computer memory (for example, RAM or ROM), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by the processing circuitry 506. In some embodiments, the processing circuitry 506 and the computer-readable storage medium 508 may be considered to be integrated.

Alternative embodiments of the UE 500 may include additional components beyond those described above that may be responsible for providing certain aspects of the UE's functionality, including any of the functionality described herein, and/or any functionality necessary to support the solution described above. As just one example, the UE 500 may include input interfaces 510, devices, and circuits, and output interfaces 512, devices, and circuits. The input interfaces 510, devices, and circuits are configured to allow input of information into the UE 500, and are connected to the processing circuitry 506 to allow the processing circuitry 506 to process the input information. For example, the input interfaces 510, devices, and circuits may include a microphone, a proximity or other sensor, keys/buttons, a touch display, one or more cameras, a USB port, or other input elements. The output interfaces 512, devices, and circuits are configured to allow output of information from the UE 500, and are connected to the processing circuitry 506 to allow the processing circuitry 506 to output information from the UE 500. For example, the output interfaces 512, devices, or circuits may include a speaker, a display, vibrating circuitry, a USB port, a headphone interface, or other output elements. Using the one or more input and output interfaces 510 and 512, devices, and circuits, the UE 500 may communicate with end users and/or the wireless network, and allow them to benefit from the functionality described herein.

As another example, the UE 500 may include a power source 514. The power source 514 may comprise power management circuitry. The power source 514 may receive power from a power supply, which may either be comprised in, or be external to, the power source 514. For example, the UE 500 may comprise a power supply in the form of a battery or battery pack which is connected to, or integrated in, the power source 514. Other types of power sources, such as photovoltaic devices, may also be used. As a further example, the UE 500 may be connectable to an external power supply (such as an electricity outlet) via an input circuitry or interface such as an electrical cable, whereby the external power supply supplies power to the power source 514. The power source 514 may be connected to the radio front-end circuitry 504, the processing circuitry 506, and/or the computer-readable storage medium 508 and be configured to supply the UE 500, including the processing circuitry 506, with power for performing the functionality described herein.

The UE 500 may also include multiple sets of the processing circuitry 506, the computer-readable storage medium 508, the radio front-end circuitry 504, and/or the antenna 502 for different wireless technologies integrated into the UE 500, such as, for example, GSM, Wideband Code Division Multiple Access (WCDMA), LTE, NR, Wi-Fi, or Bluetooth wireless technologies. These wireless technologies may be integrated into the same or different chipsets and other components within the UE 500.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, the storage 410 may comprise computer readable means on which a computer program can be stored. The computer program may include instructions which cause the processor 408 (and any operatively coupled entities and devices, such as the interface 412 and the storage 410) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by the processors 416 and/or 408, possibly in cooperation with the storage 418 and/or 410. The processors 416 and/or 408 and the storage 418 and/or 410 may thus be arranged to allow the processors 416 and/or 408 to fetch instructions from the storage 418 and/or 410 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AP Access Point
ASIC Application Specific Integrated Circuit
BSC Base Station Controller
BTS Base Transceiver Station
CD Compact Disk
CPE Customer Premise Equipment
CPU Central Processing Unit
CSI-RS Channel State Information Reference Signal
D2D Device-to-Device
DAS Distributed Antenna System
DM-RS Demodulation Reference Signal
DSP Digital Signal Processor
DVD Digital Video Disk
ECGI Enhanced Cell Global Identifier
eNB Enhanced or Evolved Node B
E-SMLC Evolved Serving Mobile Location Center
FFS For Further Study
FPGA Field Programmable Gate Array
GHz Gigahertz
gNB New Radio Base Station
GSM Global System for Mobile Communications
IoT Internet of Things
IP Internet Protocol
LAN Local Area Network
LEE Laptop Embedded Equipment
LME Laptop Mounted Equipment
LTE Long Term Evolution
M2M Machine-to-Machine
MCE Multi-Cell/Multicast Coordination Entity
MDT Minimization of Drive Tests
MME Mobility Management Entity
MSC Mobile Switching Center
MSR Multi-Standard Radio
MTC Machine Type Communication
NB-IoT Narrowband Internet of Things
NR New Radio
O&M Operation and Maintenance
OSS Operations Support System
PBCH Physical Broadcast Channel
PDA Personal Digital Assistant
PSS Primary Synchronization Signal
PSTN Public Switched Telephone Network
RAM Random Access Memory
RAT Radio Access Technology
RBS Radio Base Station
RF Radio Frequency
RNC Radio Network Controller
ROM Read Only Memory
RRH Remote Radio Head
RRM Radio Resource Management
RRU Remote Radio Unit
RS Reference Signal
SON Self-Organizing Network
SS Synchronization Signal
SSS Secondary Synchronization Signal
UE User Equipment
UMTS Universal Mobile Telecommunications System
USB Universal Serial Bus
VoIP Voice over Internet Protocol
WAN Wide Area Network
WCDMA Wideband Code Division Multiple Access
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method of operation of a User Equipment, UE, to assist a base station in a wireless communication network with automatic neighbor relation, comprising:
receiving reference signal configurations for a plurality of cells and a measurement report triggering criterion, wherein:
the reference signal configurations are configurations for reference signals to be used by the UE for radio resource management, RRM, measurement reporting for the plurality of cells; and
the measurement report triggering criterion is related to detection, by the UE, of an unknown cell while performing measurements in accordance with the reference signal configurations for the plurality of cells, where the unknown cell is a cell other than the plurality of cells for which the UE has received the reference signal configurations;
detecting the unknown cell while performing the measurements in accordance with the reference signal configurations wherein detecting the unknown cell comprises:
performing synchronization signal measurement in accordance with the reference signal configurations, where a synchronization signal from a detected cell is detected while performing the synchronization signal measurement; and
identifying the detected cell as the unknown cell upon determining that: (a) the detected cell is not one of the plurality of cells for which the UE has received the reference signal configurations and (b) a measurement for the synchronization signal from the detected cell is greater than a certain threshold; and
sending a report for the unknown cell to the base station serving a serving cell of the UE in accordance with the measurement report triggering criterion.

2. The method of claim 1 wherein, the reference signal configuration for each cell of the plurality of cells comprises information that defines measurement gaps during which the UE can measure on a synchronization signal transmitted on each cell as a synchronization source for a respective one of the reference signals transmitted on each cell.

3. The method of claim 1 wherein the report for the unknown cell is a measurement report, and the method further comprises:
after sending the measurement report for the unknown cell to the base station, receiving, from the base station, a request to read a globally unique identity of the unknown cell;
obtaining the globally unique identity of the unknown cell from system information broadcast by the unknown cell; and
reporting the globally unique identity of the unknown cell to the base station.

4. The method of claim 1 further comprising:
obtaining a globally unique identity of the unknown cell from system information broadcast by the unknown cell;

wherein the report for the unknown cell comprises the globally unique identity of the unknown cell to the base station.

5. The method of claim 1 wherein the UE is in connected mode.

6. The method of claim 1 wherein the reference signals are layer 3 reference signals for mobility purposes.

7. The method of claim 1 wherein the reference signals are Channel State Information Reference Signals, CSI-RSs.

8. The method of claim 1 wherein the reference signals are beamformed.

9. A User Equipment, UE, for assisting a base station in a wireless communication network with automatic neighbor relation, the UE configured to:
receive reference signal configurations for a plurality of cells and a measurement report triggering criterion, wherein:
the reference signal configurations are configurations for reference signals to be used by the UE for Radio Resource Management, RRM, measurement reporting for the plurality of cells; and
the measurement report triggering criterion is related to detection, by the UE, of an unknown cell while performing measurements in accordance with the reference signal configurations for the plurality of cells, where the unknown cell is a cell other than the plurality of cells for which the UE has received the reference signal configurations;
detect the unknown cell while performing the measurements in accordance with the reference signal configurations wherein detecting the unknown cell comprises:
performing synchronization signal measurement in accordance with the reference signal configurations, where a synchronization signal from a detected cell is detected while performing the synchronization signal measurement; and
identifying the detected cell as the unknown cell upon determining that: (a) the detected cell is not one of the plurality of cells for which the UE has received the reference signal configurations and (b) a measurement for the synchronization signal from the detected cell is greater than a certain threshold; and
send a report for the unknown cell to the base station serving a serving cell of the UE in accordance with the measurement report triggering criterion.

10. A User Equipment, UE, for assisting a base station in a wireless communication network with automatic neighbor relation, comprising:
an interface configured to transmit signals to and receive signals from the base station; and
a processor operable to cause the UE to:
receive, via the interface, reference signal configurations for a plurality of cells and a measurement report triggering criterion, wherein:
the reference signal configurations are configurations for reference signals to be used by the UE for Radio Resource Management, RRM, measurement reporting for the plurality of cells; and
the measurement report triggering criterion is related to detection, by the UE, of an unknown cell while performing measurements in accordance with the reference signal configurations for the plurality of cells, where the unknown cell is a cell other than the plurality of cells for which the UE has received the reference signal configurations;
detect the unknown cell while performing the measurements in accordance with the reference signal configurations wherein detecting the unknown cell comprises:
performing synchronization signal measurement in accordance with the reference signal configurations, where a synchronization signal from a detected cell is detected while performing the synchronization signal measurement; and
identifying the detected cell as the unknown cell upon determining that: (a) the detected cell is not one of the plurality of cells for which the UE has received the reference signal configurations and (b) a measurement for the synchronization signal from the detected cell is greater than a certain threshold; and
send, via the interface, a report for the unknown cell to the base station serving a serving cell of the UE in accordance with the measurement report triggering criterion.

11. A method of operation of a base station in a wireless communication network to interact with a User Equipment, UE, to provide automatic neighbor relation, comprising:
providing, to the UE, reference signal configurations for a plurality of cells and a measurement report triggering criterion, wherein:
the reference signal configurations are configurations for reference signals to be used by the UE for Radio Resource Management, RRM, measurement reporting for the plurality of cells; and
the measurement report triggering criterion is related to detection, by the UE, of an unknown cell while performing measurements in accordance with the reference signal configurations for the plurality of cells, where the unknown cell is a cell other than the plurality of cells for which the UE has received the reference signal configurations; and
receiving, from the UE in accordance with the triggering criterion, a report for unknown cell detected by the UE while performing the measurements in accordance with the reference signal configurations wherein the UE detected the unknown cell by:
performing synchronization signal measurement in accordance with the reference signal configurations, where a synchronization signal from a detected cell is detected while performing the synchronization signal measurement; and
identifying the detected cell as the unknown cell upon determining that: (a) the detected cell is not one of the plurality of cells for which the UE has received the reference signal configurations and (b) a measurement for the synchronization signal from the detected cell is greater than a certain threshold.

12. The method of claim 11 wherein, the reference signal configuration for each cell of the plurality of cells comprises information that defines measurement gaps during which the UE can measure on a synchronization signal transmitted on each cell as a synchronization source for a respective one of the reference signals transmitted on each cell.

13. The method of claim 11 wherein the report for the unknown cell is a measurement report, and the method further comprises:
upon receiving the measurement report for the unknown cell from the UE, providing, to the UE, a request to read a globally unique identity of the unknown cell; and
receiving the globally unique identity of the unknown cell from the UE.

14. The method of claim 11 wherein the report for the unknown cell received from the UE comprises a globally unique identity of the unknown cell.

15. The method of claim 11 wherein the UE is in connected mode.

16. The method of claim 11 wherein the reference signals are layer 3 reference signals for mobility purposes.

17. The method of claim 11 wherein the reference signals are Channel State Information Reference Signals, CSI-RSs.

18. The method of claim 11 wherein the reference signals are beamformed.

19. A base station in a wireless communication network for interacting with a User Equipment, UE, to provide automatic neighbor relation, the base station configured to:
   provide, to the UE, reference signal configurations for a plurality of cells and a measurement report triggering criterion, wherein:
      the reference signal configurations are configurations for reference signals to be used by the UE for Radio Resource Management, RRM, measurement reporting for the plurality of cells; and
      the measurement report triggering criterion is related to detection, by the UE, of an unknown cell while performing measurements in accordance with the reference signal configurations for the plurality of cells, where the unknown cell is a cell other than the plurality of cells for which the UE has received the reference signal configurations; and
   receive, from the UE in accordance with the triggering criterion, a report for the unknown cell detected by the UE while performing the measurements in accordance with the reference signal configurations wherein the UE detected the unknown cell by:
      performing synchronization signal measurement in accordance with the reference signal configurations, where a synchronization signal from a detected cell is detected while performing the synchronization signal measurement; and
      identifying the detected cell as the unknown cell upon determining that:
         (a) the detected cell is not one of the plurality of cells for which the UE has received the reference signal configurations and
         (b) a measurement for the synchronization signal from the detected cell is greater than a certain threshold.

20. A base station in a wireless communication network for interacting with a User Equipment, UE, to provide automatic neighbor relation, comprising:
   an interface configured to transmit signals to and receive signals from the UE; and
   a processor configured to cause the base station to:
      provide, to the UE via the interface, reference signal configurations for a plurality of cells and a measurement report triggering criterion, wherein:
         the reference signal configurations are configurations for reference signals to be used by the UE for Radio Resource Management, RRM, measurement reporting for the plurality of cells; and
         the measurement report triggering criterion is related to detection, by the UE, of an unknown cell while performing measurements in accordance with the reference signal configurations for the plurality of cells, where the unknown cell is a cell other than the plurality of cells for which the UE has received the reference signal configurations; and
      receive, from the UE via the interface in accordance with the triggering criterion, a report for the unknown cell detected by the UE while performing the measurements in accordance with the reference signal configurations wherein the UE detected the unknown cell by:
   performing synchronization signal measurement in accordance with the reference signal configurations, where a synchronization signal from a detected cell is detected while performing the synchronization signal measurement; and
   identifying the detected cell as the unknown cell upon determining that:
      (a) the detected cell is not one of the plurality of cells for which the UE has received the reference signal configurations and
      (b) a measurement for the synchronization signal from the detected cell is greater than a certain threshold.

* * * * *